United States Patent [19]

Gullichsen et al.

[11] 4,410,337
[45] Oct. 18, 1983

[54] METHOD AND AN APPARATUS FOR SEPARATING A GAS FROM A FIBRE SUSPENSION

[75] Inventors: Johan Gullichsen, Siuntio; Jaakko P. Kujala, Karhula; Toivo J. Niskanen, Hamina; Voitto O. A. Reponen, Karhula, all of Finland; Esko J. Härkönen, Karlstad, Sweden

[73] Assignee: A. Ahlstrom Osakeyhtio, Noormarkku, Finland

[21] Appl. No.: 139,162

[22] Filed: Apr. 7, 1980

[51] Int. Cl.³ .............................................. B01D 19/00
[52] U.S. Cl. ......................................... 55/21; 55/52; 55/190; 55/203; 55/409; 162/55
[58] Field of Search ................... 55/52, 184, 190, 191, 55/199, 200–203, 206, 408, 409, 41, 171, 182, 21; 162/55

[56] References Cited

U.S. PATENT DOCUMENTS

| | | | |
|---|---|---|---|
| 1,143,957 | 6/1915 | Hansen | 55/199 |
| 1,926,546 | 9/1933 | Lampen | 162/55 X |
| 1,993,944 | 3/1935 | Peebles | 55/199 X |
| 2,216,542 | 10/1940 | Paige | 55/199 X |
| 2,575,568 | 11/1951 | Topanelian, Jr. | 55/199 |
| 2,737,857 | 3/1956 | Lee | 55/199 X |
| 3,323,465 | 6/1967 | Stillebroer | 415/204 |
| 3,407,569 | 10/1968 | Hendricks | 55/52 |
| 3,597,904 | 8/1971 | Jakobsson et al. | 55/408 |
| 3,686,831 | 8/1972 | Libby | 55/199 |
| 4,201,555 | 5/1980 | Tkach | 55/52 X |
| 4,209,359 | 6/1980 | Sethy | 55/52 X |

FOREIGN PATENT DOCUMENTS

| | | | |
|---|---|---|---|
| 2920337 | 12/1979 | Fed. Rep. of Germany | 162/55 |
| 363363 | 1/1974 | Sweden . | |
| 571655 | 1/1976 | Switzerland . | |
| 558691 | 5/1975 | U.S.S.R. | 55/203 |
| 690105 | 10/1979 | U.S.S.R. | 162/55 |

Primary Examiner—Robert H. Spitzer
Attorney, Agent, or Firm—Bucknam and Archer

[57] ABSTRACT

Gas is removed from a fibre suspension of high consistency by means of an apparatus having a rotor chamber and a rotor disposed for rotation in the rotor chamber. The rotor has blades adapted to fluidize the fibre suspension and to cause a centrally located core of gas surrounded by a cylindrical layer of fibre suspension to form. The rotor has a plate located in the portion of the rotor opposite to the inlet of the rotor chamber which has an opening or openings close to the rotor axis. The gas is removed from the rotor chamber through the openings in the plate to a gas discharge and the fibre suspension essentially free of gas is discharged through an outlet. The operation of the apparatus is controlled by maintaining the pressure difference between the inlet and the gas discharge at a predetermined level.

8 Claims, 5 Drawing Figures

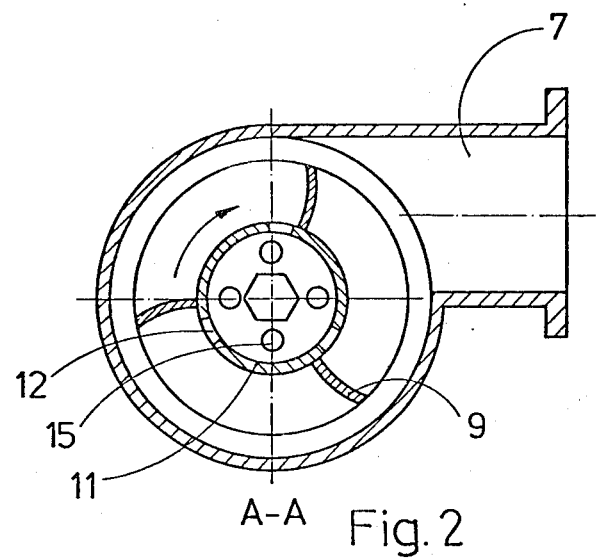
A-A  Fig. 2
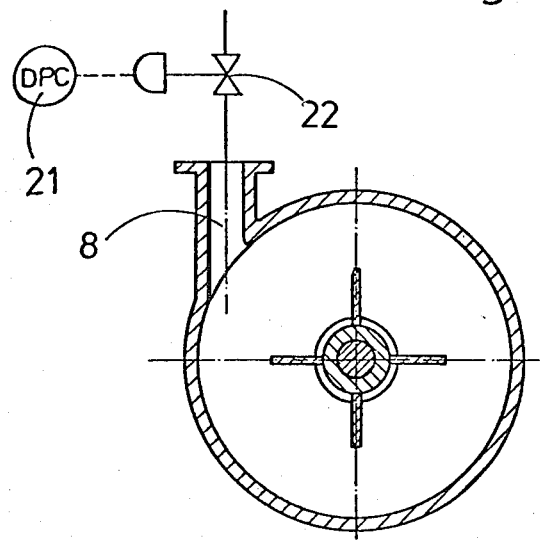
B-B  Fig. 3

METHOD AND AN APPARATUS FOR SEPARATING A GAS FROM A FIBRE SUSPENSION

BACKGROUND OF THE INVENTION

This invention relates to an apparatus for separating gas from a fibre suspension. The apparatus is especially intended to be used for pulps of high consistency, said consistency being e.g. 8 to 12%.

The air in the pulp hampers particularly the pumping of high consistency pulp by a centrifugal pump. The higher the air content of the pulp the higher the inlet pressure that the pump needs for proper function. If the inlet pressure available is too low the air in the pulp forms bubbles which accumulate in front of the inlet of the impeller and thus cause malfunction of the pump.

It is an object of the present invention to eliminate the aforesaid difficulties; this is brought about by an apparatus which effectively separates air from the pulp before it is led into the pump impeller. The apparatus can also be used without the pump if the pressure difference available is sufficient to transfer the pulp from one place to another.

SUMMARY OF THE INVENTION

The apparatus according to the invention comprises a housing having a rotor chamber provided with an inlet and an outlet for the fibre suspension, and a gas discharge, a rotor being open in the centre and mounted on a shaft and disposed for rotation in the rotor chamber and provided with blades, the blades having portions adapted to move the fibre suspension in the general direction of the rotor axis. The rotor is provided with a plate disposed substantially transverse to the rotor axis and located in the portion of the rotor which is opposite to the inlet, the plate having at least one opening close to the rotor axis. A gas compartment is disposed close to the rotor chamber, and the gas compartment communicates with the opening in the rotor plate and the gas discharge.

An advantageous embodiment of the apparatus comprises blades mounted on the rotor shaft and disposed in the gas compartment.

The invention relates also to a method for using the apparatus. Characteristic to the method according to the invention is that the difference in pressure between the inlet and the gas discharge is maintained within preset limits.

BRIEF DESCRIPTION OF DRAWINGS

The invention is described more in detail in the following with reference to the accompanying drawings where

FIG. 2 is a sectional view of FIG. 1 taken on line A—A of FIG. 1;

FIG. 3 is a sectional view of FIG. 1 taken on line B—B of FIG. 1;

DESCRIPTION OF PREFERRED EMBODIMENTS

Figure 1:
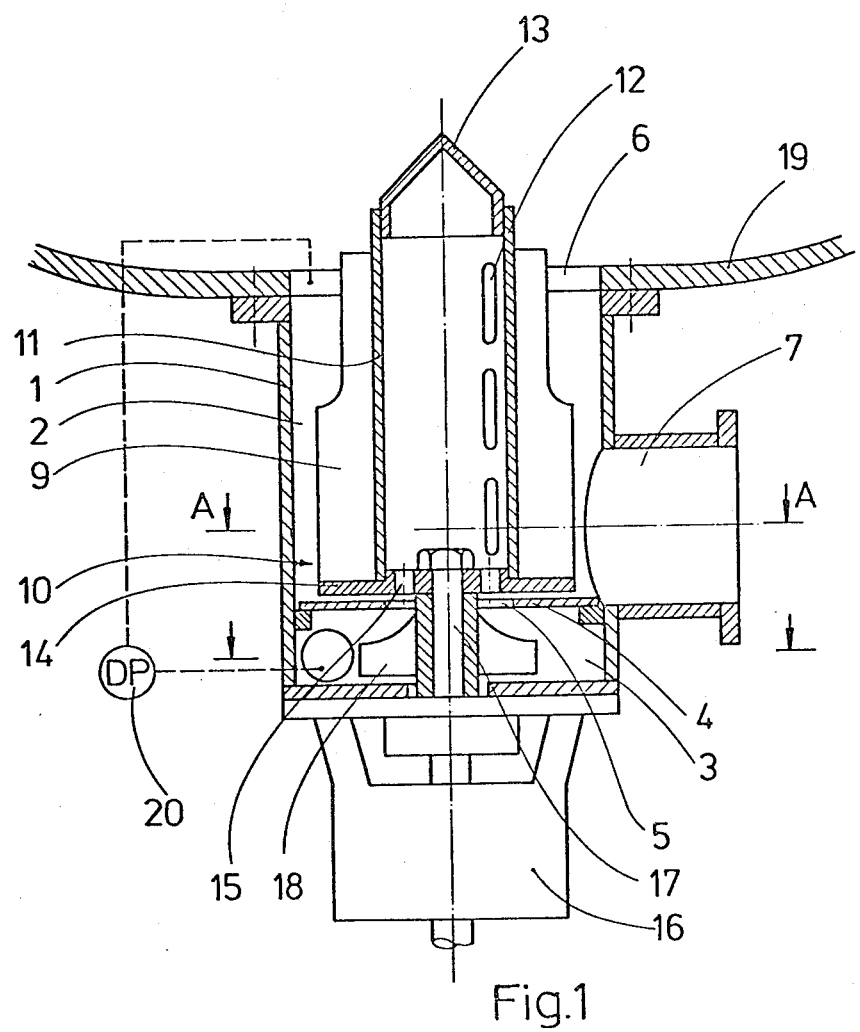
FIG. 1 shows an axial section of an embodiment of the apparatus in accordance with the invention.

The apparatus shown in FIGS. 1-3 comprises a housing 1 with a rotor chamber 2 and next to it a gas compartment 3. Between these there is a partition wall 4 provided with a centrally located opening 5 through which the rotor chamber and the gas compartment communicate. The housing has an inlet 6 through which the fibre suspension flows to the rotor chamber, and an outlet 7. The gas compartment is provided with a gas discharge 8. The rotor chamber has a rotor 10 provided with blades 9. The rotor has a tubular inner part 11 with the blades attached thereto and with openings 12. The upstream end of the inner part is closed by a conical cap 13. At its other end, transverse to the rotor axis, there is a vertical plate 14 with openings 15. The rotor plate is by means not described more in detail attached to shaft 17 journalled within a bearing housing 16. Blades 18 attached to the shaft are disposed in the gas compartment. The shaft is driven by drive means not shown on the drawings.

The apparatus can be mounted to the bottom 19 of a pulp vessel so that the rotor 10 is partly inside the vessel as shown in FIG. 1. Owing to the rotation of the rotor, the pulp close to it is fluidized and flows through the outlet 6 into the rotor chamber 2. There the rotor 10 rotating the pulp causes the air and pulp to separate so as to form a cylindrical layer of pulp around a central air space or core. The air can be discharged through the openings 12, 15 and 5 that are communicating with one another to the gas compartment 3 and therefrom lead away through the gas discharge 8. The pulp from which the air has been separated is discharged through the outlet 7.

It has been found that the measure of difference in pressure between the outlet and the gas discharge essentially affects the functioning of the apparatus. A too small difference in pressure makes the air core so big that it hampers the operation of the pump. If the difference in pressure is too big the air core becomes so small that some pulp discharges with the air through the openings 12, 15 and 5. When the apparatus is used to discharge pulp from a vessel the inlet pressure of the pump changes as the height of the pulp surface changes, the difference in pressure thus also changing. In order to prevent this, the apparatus is provided with a pressure controller by which the difference in pressure can be maintained constant. The optimal value of the difference in pressure is dependent on the consistency of the pulp and the temperature. It has been empirically proved that it should be in the range of about 0,1 to about 0,7 bar, preferably 0,2 to 0,5 bar. Depending on the available pressure, vacuum or overpressure has to be maintained in the gas discharge.

The difference in pressure between the inlet 6 and the gas discharge 8 is measured by a pressure gauge 20. The difference in pressure is compared with a set value and a controller 21 controls a control valve 22 connected to the gas discharge to maintain differential pressure at a desired level.

The object of the blades 18 disposed in the gas compartment is to disintegrate and remove pulp accumulated in this space during a standstill.

Figure 4:
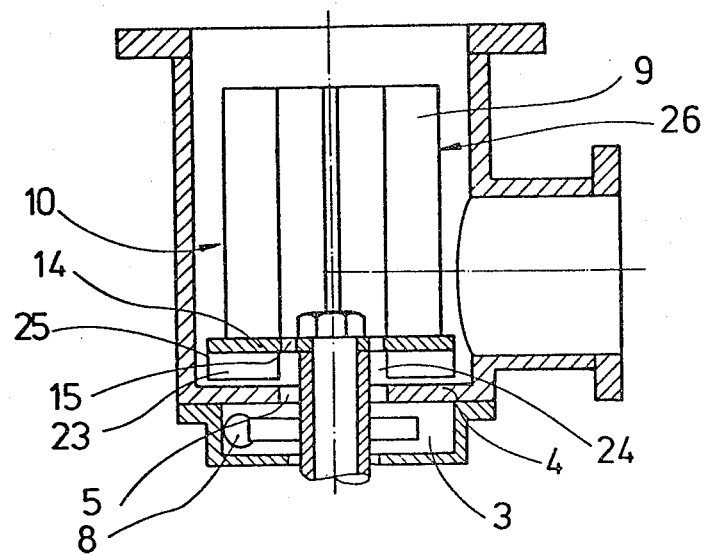
FIG. 4 shows another embodiment of the invention.

In the embodiment shown in FIG. 4, blades 23 are secured to the backside of the plate 14 of the rotor 10.

The object of the blades is to separate the pulp coming through the openings 15 in the plate 14 with the air.

The separated pulp is discharged through a passage formed by the plate 14 and the partition wall 4 so that air essentially free from pulp flows through the opening 5 into the gas compartment. The radial distance from the outer edges 25 of the blades 23 to the rotor 24 axis should preferably be larger than the distance from the outer edges 26 of the blades 9. The diameter of the air core will then increase before the opening 5 in the wall 4 and the access of the pulp to the gas compartment will be prevented.

Figure 5:
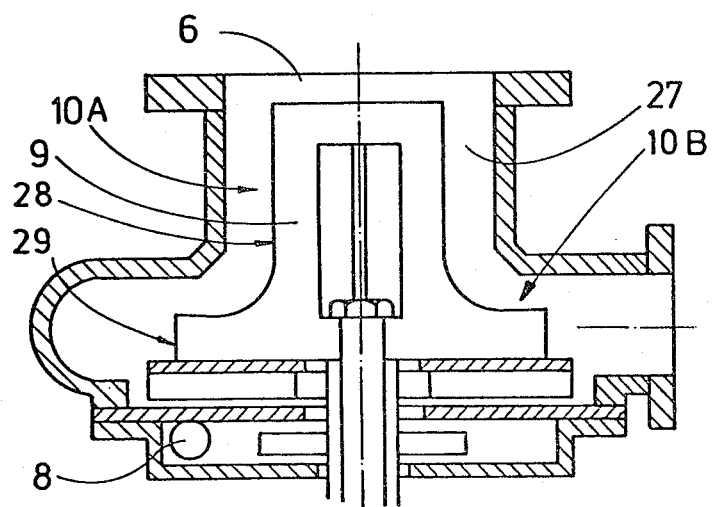
FIG. 5 illustrates a third embodiment of the invention.

In the embodiment of the invention shown in FIG. 5, the rotor which fluidize the pulp and removes air from it is disposed in the inlet port 27 of a centrifugal pump upstreams of the impeller 28 and connected to it in such a way as to form an integral rotor which comprises a first part 10 A communicating with the inlet 6, in which the radial distance of the outer edges 28 of the blades 9 to the rotor axis is small, and a second part 10 B communicating with the outlet 7, in which the radial distance of the outer edges 29 of the blades is large. In the first part 10 A of the rotor, the pulp moves substantially axially and in the other 10 B radially in respect to the rotor axis.

We claim:

1. A method of operating an apparatus for separating gas from a fibre suspension of high consistency, the apparatus including a housing having an upper chamber and a lower chamber, an upper inlet being provided in the upper chamber for receiving the fibre suspension and an outlet being provided for discharging the fibre suspension after separation of gas therefrom; in the lower chamber there being provided an inlet for receiving separated gas from the upper chamber and an outlet for discharging said gas from the lower chamber; the apparatus further including a rotor in the upper chamber that is rotatably driven to effect such separation of the gas from the fibre suspension; which method comprises the steps of:
   (a) sensing the difference in pressure between said upper inlet of the upper chamber, where the fibre suspension is received, and said gas discharge outlet of the lower chamber, and;
   (b) operating a control valve connected to said gas discharge outlet in accordance with said sensed pressure difference to maintain said pressure difference at a value within given limits.

2. A method according to claim 1 wherein the limits of said pressure difference are 0.2 bar minimum and 0.7 bar maximum.

3. An apparatus for separating gas from a fibre suspension of high consistency, which comprises:
   (a) a housing having an upper chamber provided with an upper inlet for receiving the fibre suspension and a lower outlet for discharging said fibre suspension after separation of gas therefrom;
   (b) a lower chamber in said housing provided with an upper inlet communicating with said upper chamber for receiving said separated gas from said upper chamber and an outlet for discharging said gas from said lower chamber;
   (c) a shaft extending in said upper and lower chambers, said shaft being rotatable relative thereto;
   (d) a first rotor disposed in said upper chamber and connected to said shaft for rotation therewith, said first rotor having blades positioned to define a clearance space extending radially about the axis of rotation, said clearance space communicating with said lower chamber through said upper inlet thereof to pass into said lower chamber gas centrifugally separated from the fibre suspension by the rotation of said first rotor;
   (e) said first rotor having a plate disposed substantially transverse to the axis of said rotor and located adjacent to the upper inlet of said lower chamber, said plate of the first rotor having at least one open passage allowing said gas to pass therethrough; and
   (f) a second rotor disposed in said lower chamber and connected to said shaft for rotation therewith, said second rotor having blades effective to remove from said lower chamber through the outlet thereof such fibre as may enter said lower chamber.

4. An apparatus according to claim 3, including on said plate of the first rotor, and on the back side of said plate opposite to the blades on the front side thereof defining said clearance space, a plurality of additional blades that urge the first suspension outwardly into said lower outlet of the upper chamber.

5. An apparatus according to claim 4, wherein the blades on the back side of said plate of the first rotor extend radially outward beyond the radial extension of the blades on the front side of said plate.

6. An apparatus according to claim 3, wherein the radial distance from the outer edges of said blades of the first rotor to the rotation axis thereof is greater than the radial distance from the outer edges of said blades of the second rotor to said rotation axis.

7. An apparatus according to claim 3, wherein said first rotor extends through the upper inlet of said housing into a fibre pulp containing vessel connected thereto, and the rotation axis of said first rotor is substantially vertical.

8. An apparatus for separating a gas from a fibre suspension of high consistency, which comprises:
   (a) a housing having a first chamber provided with an inlet for receiving the fibre suspension and an outlet for discharging said fibre suspension after separation of gas therefrom;
   (b) a second chamber in said housing provided with an inlet communicating with said first chamber for receiving said separated gas from said first chamber and an outlet for discharging said gas from said second chamber;
   (c) a shaft extending in said first and second chambers, said shaft being rotatable relative thereto;
   (d) a first rotor disposed in said first chamber and connected to said shaft for rotation therewith, said first rotor having blades positioned to define a clearance space extending radially about the axis of rotation, said clearance space communicating with said second chamber through said inlet thereof to pass into said second chamber gas centrifugally separated from the fibre suspension by the rotation of said first rotor;
   (e) said first rotor having a plate disposed substantially transverse to the axis of said rotor and located adjacent to the inlet of said second chamber, said plate of the first rotor having at least one open passage allowing said gas to pass therethrough; and
   (f) a second rotor disposed in said second chamber and connected to said shaft for rotation therewith, said second rotor having blades effective to remove from said second chamber through the outlet thereof such fibre as may enter said second chamber.

* * * * *